(12) United States Patent
Larson et al.

(10) Patent No.: US 8,051,210 B2
(45) Date of Patent: Nov. 1, 2011

(54) SERVER WITH LAN SWITCH THAT CONNECTS PORTS BASED ON CONNECTION INFORMATION RECEIVED FROM FIRST AND SECOND LANS

(75) Inventors: Thane M. Larson, Roseville, CA (US); Loren Koehler, Fair Oaks, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2272 days.

(21) Appl. No.: 10/271,516

(22) Filed: Oct. 15, 2002

(65) Prior Publication Data

US 2004/0073712 A1    Apr. 15, 2004

(51) Int. Cl.
G06F 15/16    (2006.01)

(52) U.S. Cl. ............ 709/249; 709/250; 709/317; 707/6; 707/10; 370/245

(58) Field of Classification Search .................. 709/249, 709/250, 317; 370/245–352, 244; 707/3–10; 701/110–143
See application file for complete search history.

(56) References Cited

U.S. PATENT DOCUMENTS

| | | | |
|---|---|---|---|
| 5,544,006 A | 8/1996 | Radloff et al. | |
| 5,809,262 A | 9/1998 | Potter | |
| 5,914,938 A * | 6/1999 | Brady et al. | 370/254 |
| 6,046,912 A | 4/2000 | Leman | |
| 6,058,011 A | 5/2000 | Hardt et al. | |
| 6,070,243 A * | 5/2000 | See et al. | 726/2 |
| 6,112,271 A | 8/2000 | Lanus et al. | |
| 6,129,591 A | 10/2000 | Czeschka | |
| 6,138,247 A | 10/2000 | McKay et al. | |
| 6,161,197 A | 12/2000 | Lanus et al. | |
| 6,162,073 A | 12/2000 | Haq et al. | |
| 6,163,543 A * | 12/2000 | Chin et al. | 370/400 |
| 6,166,902 A | 12/2000 | Liu | |
| 6,185,093 B1 | 2/2001 | Moss | |
| 6,185,110 B1 | 2/2001 | Liu | |
| 6,195,262 B1 | 2/2001 | Bodette et al. | |
| 6,198,633 B1 | 3/2001 | Lehman et al. | |
| 6,209,051 B1 | 3/2001 | Hill et al. | |
| 6,237,048 B1 | 5/2001 | Allen et al. | |
| 6,252,878 B1 * | 6/2001 | Locklear et al. | 370/401 |
| 6,560,227 B1 * | 5/2003 | Bartoldus et al. | 370/390 |
| 7,046,624 B1 * | 5/2006 | Iwatsuki et al. | 370/229 |
| 2002/0116539 A1 * | 8/2002 | Bryczkowski et al. | 709/317 |
| 2003/0051166 A1 * | 3/2003 | Garnett et al. | 713/201 |
| 2003/0177290 A1 * | 9/2003 | Ayukawa et al. | 710/10 |
| 2004/0003284 A1 * | 1/2004 | Campbell et al. | 713/201 |

OTHER PUBLICATIONS

Broadcom; "BCM5382M Product Brief"; May 20, 2002; 2 pgs.
Broadcom; "BCM5380M Product Brief"; May 20, 2002; 2 pgs.

(Continued)

*Primary Examiner* — Tina Nguyen

(57) ABSTRACT

A server includes a processor, a memory, and a plurality of interfaces for outputting server status information. A LAN switch includes a first port configured to be coupled to a first LAN, a second port configured to be coupled to a second LAN, and a plurality of interface connection ports. Each interface connection port is configured to be coupled to one of the plurality of interfaces. The LAN switch is configured to selectively connect ports of the switch based on a combination of a first set of connection information received from the first LAN through the first port and a second set of connection information received from the second LAN through the second port.

27 Claims, 4 Drawing Sheets

OTHER PUBLICATIONS

Cisco webpage: www.cisco.com/warp/public/473/lan-switch-cisco.shtml; "How LAN Switches Work"; Jul. 17, 2002; 15 pgs.
PCT Industrial Computers Manufacturers Group (PCIMG); "CompactPCI Specification Short Form"; Sep. 2, 1997; 7 pgs.
Hewlett-Packard Company, Management and Configuration Guide, "HP ProCurve Switches 2512 and 2524"; Aug. 2000; 392 pgs.
Ziatech homepage: www.ziatech.com; Ziatech, an Intel Company, Leaders in CompactPCI Innovation; 2001; 2 pgs.

* cited by examiner

300

| "OUTPUT" PORT | 150D | | | | 150E | | | |
|---|---|---|---|---|---|---|---|---|
| "INPUT" PORT | 150A | 150B | 150C | X | 150A | 150B | 150C | X |
| BIT # | 7 | 6 | 5 | 4 | 3 | 2 | 1 | 0 |

Fig. 3

SERVER WITH LAN SWITCH THAT CONNECTS PORTS BASED ON CONNECTION INFORMATION RECEIVED FROM FIRST AND SECOND LANS

THE FIELD OF THE INVENTION

The present invention generally relates to servers, and more particularly to a server with a local area network (LAN) switch.

BACKGROUND OF THE INVENTION

Management (console) communications are used in server systems to send and receive status, control and configuration information. Management communications are typically transmitted and received via a single local area network (LAN) interface (i.e., a LAN that combines management and payload communications), or via a cable to an RS-232 port on the server.

When there is no management LAN, each server typically includes an RS-232 port for management communications. When a large number of servers are to be controlled, a complex, hard-to-manage wiring bundle to each individual server's RS-232 port is typically implemented, which connects each individual server with a complex set of switch networks. Using an RS-232 port for management communications is sufficient for a single stand-alone server, but when the server is integrated with many others, a separate cable for each server is difficult to maintain and configure.

As an alternative to dedicated RS232 ports, some servers will use a LAN interface commonly implemented as a Network Interface Card (NIC) configured and maintained through the operating system. Normally this LAN is used for application and customer payload information, and the management functions are an add-on.

If a single LAN interface is used, there is a security hole in that management information commingles with payload information on a single LAN. This commingling of signals on a single LAN allows for unauthorized snooping, and the potential for unauthorized communications to console devices. For a single LAN interface, a security driven software layer can be used (at additional cost), but there is a possibility that the security layer could be compromised. The mixed data stream is vulnerable to security breaches even if firewalls are used. Unauthorized access by an application user to chassis management functions could lead to permanent data corruption for all users. Similarly, unauthorized access by a chassis administrator to an application could lead to a compromise of secure data.

With the single LAN solution, the content on the LAN can be segregated outside of the system to the two different streams, management and payload. This forces the same solution on all systems in a data center. A system-by-system solution is difficult to obtain and maintain. In addition, by having the segregation in commercial, sometimes publicly accessible switches, the possibility of hacking is greatly increased. Once the LANs are linked through an external switch, management or information technology (IT) personnel would typically configure the system, and then hand it over to the application users/developers, who would typically change passwords for security reasons to lock out the IT personnel from the system. Only through manual intervention and coordination between the two types of users can full manageability be obtained.

It would be desirable to provide a server with a more convenient, flexible, and secure system for management communications.

SUMMARY OF THE INVENTION

One form of the present invention provides a server including a processor, a memory, and a plurality of interfaces for outputting server status information. A LAN switch includes a first port configured to be coupled to a first LAN, a second port configured to be coupled to a second LAN, and a plurality of interface connection ports. Each interface connection port is configured to be coupled to one of the plurality of interfaces. The LAN switch is configured to selectively connect ports of the switch based on a combination of a first set of connection information received from the first LAN through the first port and a second set of connection information received from the second LAN through the second port.

BRIEF DESCRIPTION OF THE DRAWINGS

FIG. 3 is a diagram of a table illustrating the format of register keys according to one embodiment of the present invention.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
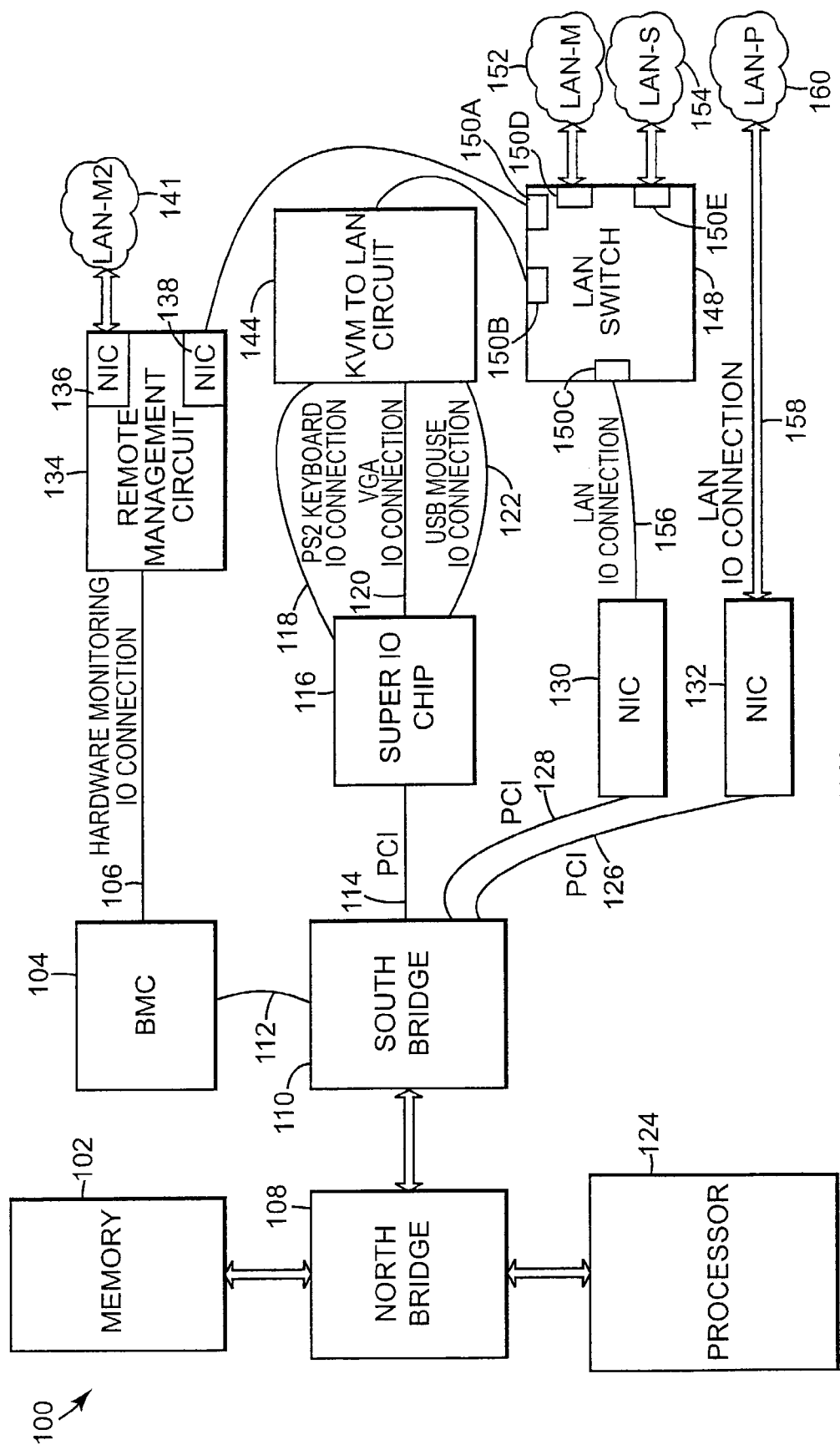
FIG. 1 is an electrical block diagram illustrating major components of a server with a LAN switch according to one embodiment of the present invention.

FIG. 1 is an electrical block diagram of a server 100 with a local area network (LAN) switch 148 according to one embodiment of the present invention. Server 100 includes memory 102, base management controller (BMC) 104, remote management circuit 134, north bridge 108, south bridge 110, super I/O chip 116, Keyboard-Video-Mouse (KVM) to LAN circuit 144, processor 124, network interface cards (NICs) 130 and 132, and LAN switch 148. In one embodiment, the components of server 100 are all commercially available and custom circuitry is not used.

In one embodiment of the present invention, server 100 is a server blade for a bladed server system, such as Hewlett Packard's bh7800 bladed system. In a bladed system, different types of system cards (blades) are inserted into a common chassis. A back-plane provides connectivity, and power and cooling is shared by the blades. This approach typically allows denser systems to be built than is possible with racks of conventional servers. Blades that might be included in a bladed server system include a server management card (SMC) blade, one or more network blades, server blades, and storage blades. Information describing bladed server systems offered by Hewlett-Packard is available on Hewlett-Packard's website at http://www.hp.com. Although embodiments of the present invention are described in the context of a bladed server system, the techniques described herein are also applicable to other types of server systems, as will be understood by persons of ordinary skill in the art. For example, embodiments of the present invention provide benefits to any dense server deployment, such as a rack of 1U stand-alone servers.

As shown in FIG. 1, server 100 is configured to be coupled to four LANs 141, 152, 154, and 160. In one embodiment, backup management LAN (LAN-M2) 141 and primary management LAN (LAN-M) 152 are configured to be accessible to a first set of authorized users, referred to herein as information technology (IT) users, and primary payload LAN (LAN-P) 160 and secondary payload and management LAN (LAN-S) 154 are configured to be accessible to a second set of authorized users, referred to herein as application users. In general, the IT users do not have access to LANs 154 and 160, and the application users do not have access to LANs 141 and 152.

In one embodiment, primary payload LAN 160 is configured for payload content (e.g., application content) communications; LAN 154 is configured for payload (e.g., redundant application content) and management content communications; and management LANs 141 and 152 are configured for management content communications.

For security purposes, physically separate LANs could be provided, with one set of LANs dedicated solely to payload content, and a second set of LANs dedicated solely to management content. Although providing physically separate LANs helps eliminate security problems, this solution does not deal with the conflicting interest of having some management content available to both the application and the management (IT) sides. The completely segregated solution does not address the situation where management content might be needed by the application side of the solution.

Management content typically includes system/infrastructure level management content and application/operating system level management content. System/infrastructure level management content includes information and applications such as infrastructure user consoles, hardware resets, hardware alert messaging, chassis-level password management, firmware upgrades, and chassis-level security management. These types of system-level operations should not be generally available to a software developer or a general-purpose application user in a server system that can host many systems, users, and even competitors with the same infrastructure. However, there is a subset of management content (i.e., application/operating system level management content) that may be needed by an application user or developer, such as local user consoles, software resets, OS and application alert messaging, user password management, OS and software upgrades, and application security management.

These two types of management content can be separated and put out on two segregated LANs (e.g., application/operating system level management content on secondary payload and management LAN 154, and system/infrastructure level management content on primary management LAN 152). However, the management (IT) side of the solution would then be shielded from application/operating system level management content, and only system level management would be available on the management LAN 152 unless expensive and custom hardware were used.

One embodiment of the present invention addresses the concerns of keeping payload content secure from unauthorized access by IT users, while providing a flexible solution for securely routing appropriate management content to both the application users and IT users.

Referring again to FIG. 1, memory 102 stores application program instructions, data, and an operating system. The operating system controls the processor 124 and the memory 102 for system operations and for executing the application program instructions. Processor 124 and memory 102 are coupled together via north bridge 108. North bridge 108 is also coupled to south bridge 110. Super I/O chip 116 is coupled to south bridge 110 via peripheral component interconnect (PCI) link 114. The north/south bridge architecture with a super I/O chip shown in FIG. 1 is a common architecture that is known to those of ordinary skill in the art.

Base management controller (BMC) 104 is coupled to south bridge 110 via interface 112. In one embodiment, interface 112 is an Intelligent Platform Management Interface (IPMI). The IPMI specification is a standard defining an abstracted interface to platform management hardware. BMC 104 is also coupled to remote management circuit 134 via hardware monitoring I/O connection 106. BMC 104 monitors hardware events that are communicated across interface 112 (e.g., chip failures, disk drive failures, fan sensor information, voltage sensor information, temperature sensor information, etc.), and reports these events to remote management circuit 134. Remote management circuit 134 includes network interface cards (NICs) 136 and 138. Network interface card 136 is coupled to backup management LAN 141. Network interface card 138 is coupled to port 150A of LAN switch 148. BMC 104 and remote management circuit 134 provide a mechanism of hardware control and monitoring of circuitry in server 100. In one embodiment, remote management circuit 134 provides a LAN-based console access to the server 100 that does not depend on the state of the operating system of the server 100.

The connections between super I/O chip 116 and KVM to LAN circuit 144 include a PS2 keyboard I/O connection 118, a Video Graphics Array (VGA) I/O connection 120, and a Universal Serial Bus (USB) mouse I/O connection 122. KVM to LAN circuit 144 receives keyboard, video, and mouse data (KVM data) from super I/O chip 116 and translates the data into an appropriate coding structure for transmission over a LAN in a conventional manner known to those of ordinary skill in the art. A client computer can then receive the KVM data and view a "snapshot" of what the screen looks like on the server 100 that transmitted the KVM data. Because the KVM data provides a snapshot of what the server screen looks like, the KVM data should be treated as sensitive data.

Network interface cards 130 and 132 are coupled to south bridge 110 via PCI links 128 and 126, respectively. Network interface card 130 is coupled to port 150C of LAN switch 148 via LAN I/O connection 156. Network interface card 132 is coupled to primary payload LAN 160 via LAN I/O connection 158. In one embodiment, server 100 sends application/operating system level management content and other application/operating system data through NIC 130 to LAN switch 148. In one form of the invention, such application/operating system level information includes alerts indicating software failures, and information indicating whether the operating system is up or down, and panics and shutdowns. In one embodiment, payload content is transmitted between NIC 132 and primary payload LAN 160 without going through LAN switch 148.

LAN switch 148 includes ports 150A-150E (collectively referred to as ports 150). For convenience in describing the operation of LAN switch 148, ports 150A, 150B, and 150C, may be considered "input" ports, and ports 150D and 150E may be considered "output" ports, although all of the ports 150 are bi-directional ports in one embodiment. Because of the three "input" ports and the two "output" ports, five-port switch 148 is also referred to as a three-to-two switch. Ports 150D and 150E are coupled to primary management LAN 152 and secondary payload and management LAN 154, respectively.

In one embodiment, the data through port 150A is management content, the data through port 150B is a combination of payload content and management content, and the data through port 150C is a combination of payload content and management content. In one embodiment, the data through port 150D is management content, and the data through port 150E is a combination of payload content and management content. In one form of the invention, connections between select input ports 150A-150C and output ports 150D-150E are configured from primary management LAN 152 and secondary payload and management LAN 154 to route appropriate management content to both LANs 152 and 154, while maintaining the security of the payload content, as described in further detail below with reference to FIGS. 2 and 3.

Figure 2:
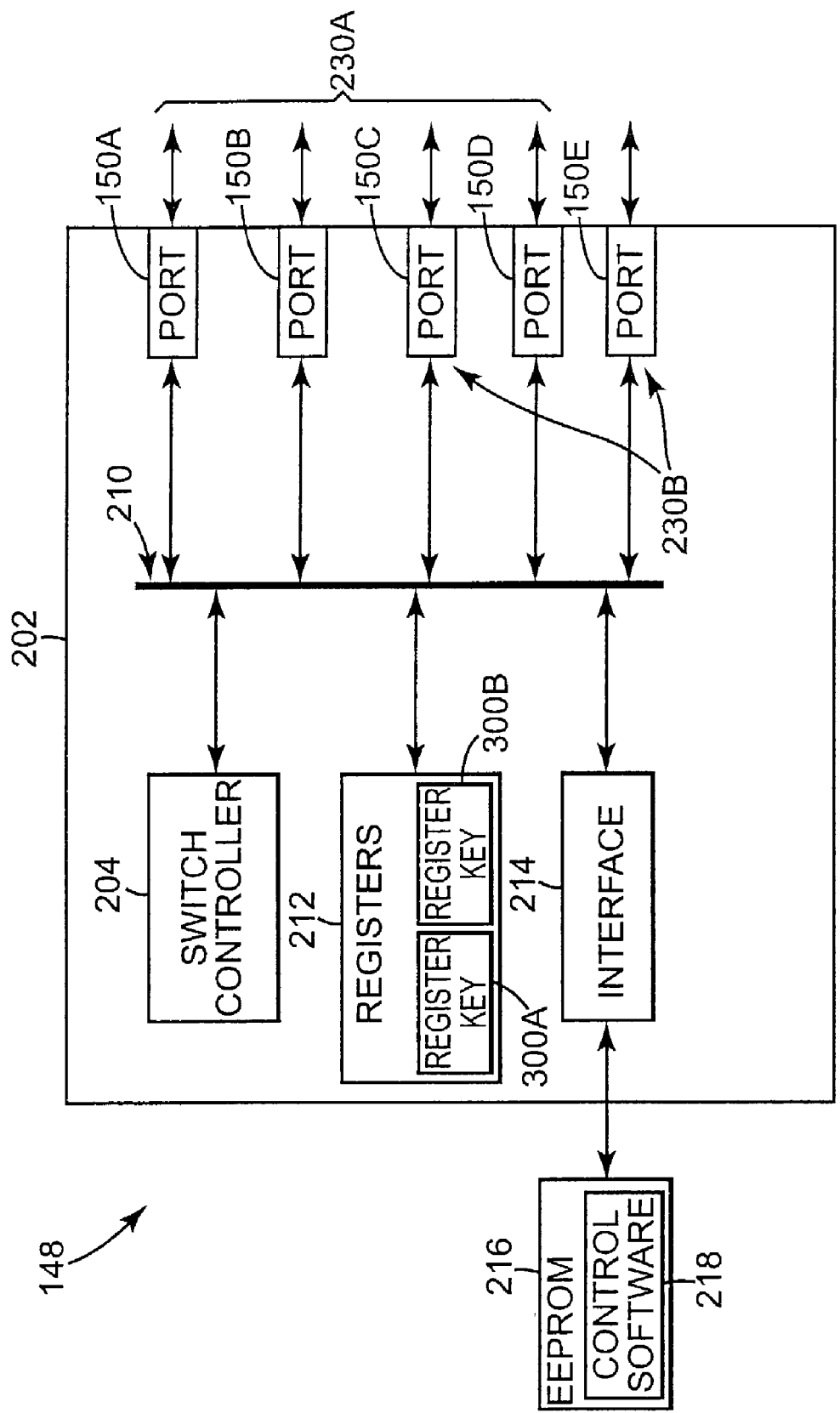
FIG. 2 is an electrical block diagram illustrating the LAN switch shown in FIG. 1 in additional detail according to one embodiment of the present invention.

FIG. 2 is an electrical block diagram illustrating the LAN switch 148 shown in FIG. 1 in additional detail according to one embodiment of the present invention. LAN switch 148 includes switch integrated circuit (switch IC) 202 and electrically erasable programmable read only memory (EEPROM) 216. Switch IC 202 includes switch controller 204, ports 150A-150E, registers 212, and I/O interface 214, which are communicatively coupled together via communication link 210. In one embodiment, switch IC 202 is an off-the-shelf integrated circuit, such as a BCM5325, BCM5382, or BCM5380M, which are Broadcom Corporation products. Alternative embodiments may use other switch circuits offered by other vendors, or custom switch circuits.

EEPROM 216 is coupled to switch IC 202 via I/O interface 214. In one embodiment, control software 218 for controlling switch IC 202 is stored in EEPROM 216. In an alternative embodiment, switch IC 202 includes on-board storage for storing control software and/or firmware.

In one embodiment, LAN switch 148 is configured to use port-based virtual local area networks (VLANs). In one embodiment, two default virtual LANs 230A and 230B with different subnets are set up within LAN switch 148. As shown in FIG. 2, a first VLAN 230A includes ports 150A, 150B, 150C, and 150D, and a second VLAN 230B includes ports 150C and 150E. In one embodiment, a user logged into VLAN 230A would not have any visibility into VLAN 230B, and a user logged into VLAN 230B would not have any visibility into VLAN 230A.

As shown in FIG. 2, registers 212 include two programmable registers or "register keys" 300A and 300B (collectively referred to as register keys 300). In one embodiment, VLANs 230A and 230B may be reconfigured by modifying the contents of the register keys 300.

FIG. 3 is a diagram illustrating the format of one of the register keys 300 according to one embodiment of the present invention. In one form of the invention, both register keys 300A and 300B have the same format (shown in FIG. 3). In one embodiment, the content of register keys 300 determines what connectivity is allowed between the input ports 150A-150C and the output ports 150D-150E of switch 148. In one embodiment, LAN switch 148 has an Internet Protocol (IP) address associated with it and only allows configuration changes to be made through the output ports 150D-150E. In one form of the invention, register key 300A can only be changed through port 150D, and register key 300B can only be changed through port 150E. In one embodiment, connection or configuration information is sent from management LAN 152 to port 150D to change the contents of register key 300A as desired, and connection or configuration information is sent from secondary payload and management LAN 154 to port 150E to change the contents of register key 300B as desired.

As shown in FIG. 3, each register key 300 includes eight bits, numbered 0-7. An "x" is placed in bit positions 0 and 4, where x indicates that these bits are reserved for a future additional port. Bits 1-3 are used to indicate the permissibility of a connection between output port 150E and input ports 150C, 150B, and 150C, respectively. Bits 5-7 are used to indicate the permissibility of a connection between output port 150D and input ports 150C, 150B, and 150A, respectively.

In one form of the invention, the register keys 300 are used by switch controller 204 to determine if communication is allowed between particular input ports 150A-150C and output ports 150D-150E. For example, a one in bit 7 indicates that a link is allowed between port 150A and port 150D; and a zero in bit 2 indicates that a link is disallowed between port 150B and port 150E.

In one embodiment, the logical AND of the two register keys 300 is performed by switch controller 204 to establish the connectivity. For example, suppose the first register key 300A (controlled through port 150D) is set to: 1110 0010; and the second register key 300B (controlled through port 150E) is set to: 1000 1110; then the logical AND of the two register keys 300 is: 1000 0010 (i.e., only bits 7 and 1 are set). Thus, the resultant connections allowed by the LAN switch 148 are ports 150A-to-150D and 150C-to-150E. This embodiment allows for either output port 150D or 150E to disconnect the other, and connections can be established if both ports 150D and 150E agree to make the connections. Thus, in one form of the invention, with the register keys 300, either a superuser on management LAN 152 or a superuser on secondary payload and management LAN 154 can cut connections, but cooperation is required in one embodiment to open the connections. Because of these abilities, the control software 218 for the LAN switch 148 should have a good security policy for accessing the register keys 300.

In one embodiment, in order to return the switch 148 to a useable state in the event of initial deployment or a catastrophic error, a hardware jumper is supplied to the switch 148, which sets both register keys' settings to: 1110 0010.

Typically, VLANs are setup in a LAN switch by logging into the switch as a superuser, and setting up the desired VLAN configurations. However, with the two register keys 300 used in one embodiment of the present invention, the superuser coming in on port 150D has essentially been limited to a single key 300A, and the same is true for the superuser coming in on port 150E. The combination or comparison of these independent keys 300 determines the configuration of the overall port-based VLANs. In one embodiment, LAN switch 148 is restricted from allowing ports 150D and 150E to communicate, so these two ports will not be on the same VLAN.

Typically, the information from the remote management circuit 134 would only go out on port 150D to management LAN 152, and be used by IT users. However, some application users running applications on LAN 154 may want to have more control of the infrastructure, and may require access to the remote management circuit 134. For such users, the LAN switch 148 can be configured through the two ports 150D and 150E as described above to allow connectivity between ports 150A and 150E.

In addition, the following are some other possible scenarios and the connections and disconnections between ports 150 in switch 148 that might be configured for these scenarios. During initial installation of server 100, an IT user on management LAN 152 may need full access to ports 150A-150C, so port 150D is connected to ports 150A-150C. If a secure application is running on server 100, an application user on LAN 154 may need full access to ports 150B and 150C, and an IT user on management LAN 152 may need access to port 150A, so port 150E is connected to ports 150B and 150C, and port 150D is connected to port 150A. If a customer on LAN 154 fails to pay its bill, a user on management LAN 152 can cut off access of LAN 154 to ports 150B and 150C by closing these connections as described above. If a customer on LAN 154 discovers a security breach, the customer may cut off all connections between ports 150 except the connection between ports 150E and 150C. If an IT user on management LAN 152 discovers a security breach, the IT user may cut off all connections between ports 150 except the connection between ports 150D and 150A. If a user on LAN 154 has a failure and needs IT support, access to ports 150A-150C through the management LAN 152 may be opened by connecting port 150D to ports 150A-150C.

The design of the register-key structure according to one embodiment provides flexibility in allowing virtually any VLAN combination to be programmed, which allows the different needs of IT users and application users to be satisfied, while maintaining security of the content on the LANs.

Figure 4:
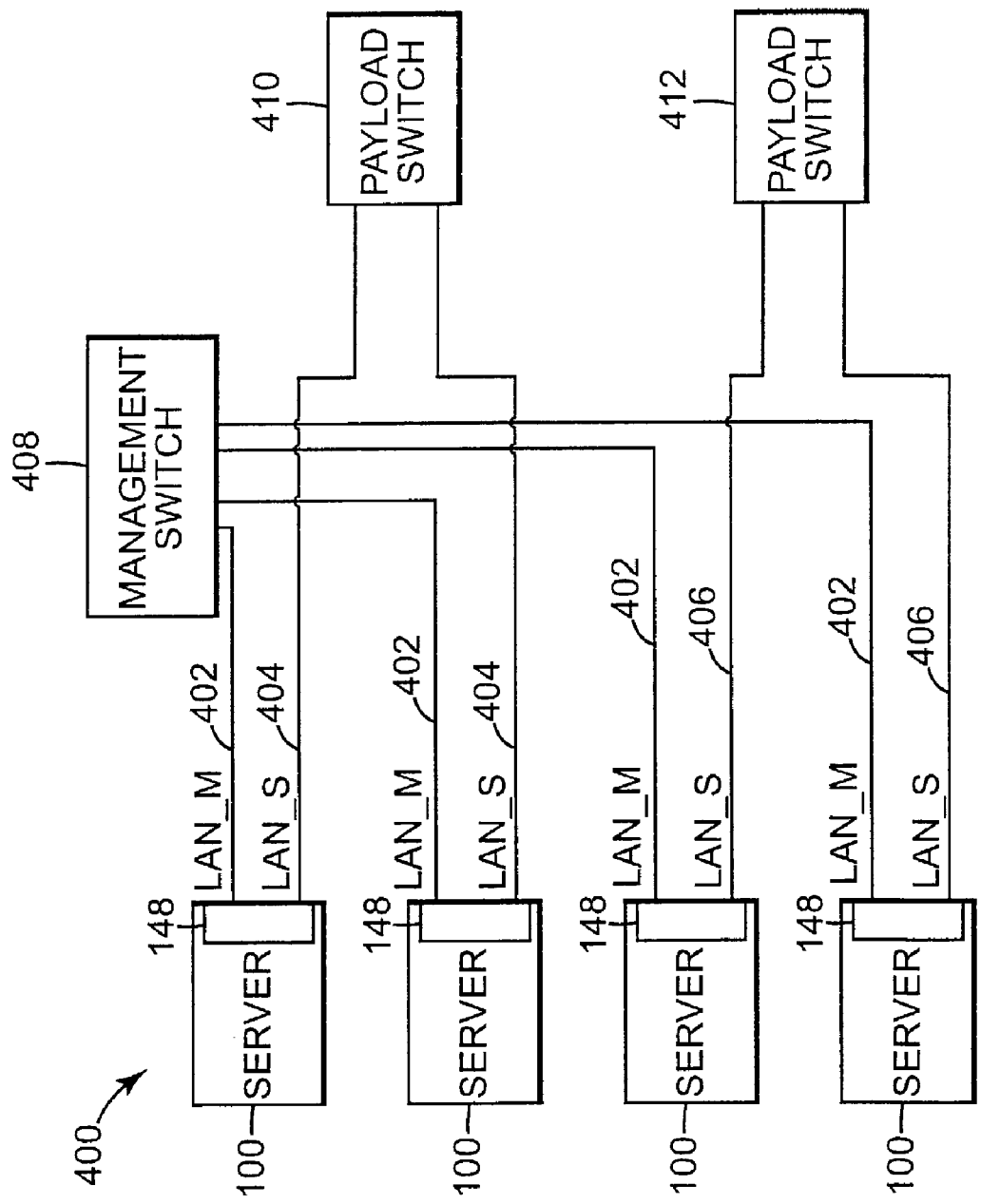
FIG. 4 is a block diagram illustrating major components of a server system according to one embodiment of the present invention.

FIG. 4 is a block diagram illustrating a server system 400 according to one embodiment of the present invention. Server system 400 includes a plurality of servers 100 (shown in FIG. 1), a management LAN switch 408, and two payload LAN switches 410 and 412. Each server 100 includes a LAN switch 148 (shown in FIGS. 1 and 2). In one embodiment, server system 400 is a bladed server system, and each server 100 is a blade in the system. In another embodiment, system 400 represents a rack of server boxes, and each server 100 represents a single server box in the rack.

Port 150D of the LAN switch 148 for each server 100 in system 400 is connected to management switch 408 via communication links 402. Port 150E of the LAN switch 148 for the top two servers 100 in FIG. 4 are connected to payload LAN switch 410 via communication links 404. Port 150E of the LAN switch 148 for the bottom two servers 100 in FIG. 4 are connected to payload LAN switch 412 via communication links 406. Management switch 408 provides an interface between the communication links 402 of the servers 100 and one or more management LANs 152 (shown in FIG. 1). Payload switches 410 and 412 provide an interface between the communication links 404 and 406 of the servers 100 and one or more secondary payload and management LANs 154 (shown in FIG. 1).

In one embodiment, management switch 408 is implemented on a blade in system 400, such as on a server management card. In another embodiment, management switch 408 is implemented as a standalone switch. Similarly, payload LAN switches 410 and 412 are implemented as LAN switch blades in one embodiment, and standalone switches in another embodiment.

To simplify the illustration, the communication links from servers 100 for the secondary management LAN 141 and the primary payload LAN 160 are not shown in FIG. 4. There are several different conventional methods to route these signals from the servers 100 to the appropriate LANS, which will be known to those of ordinary skill in the art.

One embodiment of the present invention provides a server 100 with an on-board switch 148 that provides full management access to the server operating system, KVM control, and system management (e.g., the remote management circuit 134). In one form of the invention, with the integrated switch 148, using custom control software/firmware 218 and VLAN capability, security is maintained and flexibility of configurations is provided. One embodiment provides a server that is configured to selectively aggregate services onto segregated external LANs. In addition, in one embodiment, all console types are supported over either of the two LAN connections 152 or 154, thus allowing an optimal remote management solution.

In one form of the invention, higher-level management software such as Openview Network Node Manager, Tivoli, TopTools, etc. can fault-manage a server blade 100 in a bladed server system, as well as the chassis through a single management LAN connection 152. Alternatively, the application user can gain access to a customizable, limited set of management tools that can be controlled dynamically by IT support from the management LAN 152.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A server comprising:
   a processor;
   a memory;
   a plurality of interfaces for outputting server status information;
   a LAN switch including a first port configured to be coupled to a first LAN, a second port configured to be coupled to a second LAN, and a plurality of interface connection ports, each interface connection port configured to be coupled to one of the plurality of interfaces; and
   wherein the LAN switch is programmable to define allowable and prohibited connections between the first port and each of the interface connection ports and between the second port and each of the interface connection ports of the LAN switch based on a combination of a first set of connection information received from the first LAN through the first port and a second set of connection information received from the second LAN through the second port, thereby defining a first set of the interfaces that are accessible via the first LAN and a second set of the interfaces that are accessible via the second LAN.

2. The server of claim 1, wherein the first LAN is a management LAN, and the second LAN is a payload and management LAN.

3. The server of claim 1, wherein the LAN switch includes a first register that is programmable only with connection information received through the first port, and a second register that is programmable only through connection information received through the second port, and wherein the contents of the first and the second registers identify allowable and prohibited connections between the ports of the LAN switch.

4. The server of claim 3, wherein the LAN switch is configured to allow a connection between two ports of the switch if the first and the second registers indicate that the connection is allowable, and is configured to disallow a connection between two ports of the switch if at least one of the first and the second registers indicate that the connection is not allowable.

5. The server of claim 1, wherein the plurality of interfaces include a first interface for outputting hardware status information to a first one of the interface connection ports, and a second interface for outputting operating system status information to a second one of the interface connection ports.

6. The server of claim 5, wherein the plurality of interfaces include a third interface for outputting keyboard-video-mouse (KVM) data to a third one of the interface connection ports.

7. The server of claim 1, wherein the server is configured as a blade for a bladed server system.

8. The server of claim 1, wherein the server is configured as a stand-alone server.

9. The server of claim 1, wherein a first and a second virtual LAN (VLAN) are configured in the LAN switch based on the connection information received through the first and the second ports.

10. A method of selectively routing information from a server to a plurality of LANs, the method comprising:
providing a LAN switch having a set of interface connection ports connected to server interfaces of the server and a set of LAN ports connected to the plurality of LANs;
receiving with the LAN switch a first set of configuration information from a first one of the plurality of LANs via a first one of the LAN ports;
receiving with the LAN switch a second set of configuration information from a second one of the plurality of LANs via a second one of the LAN ports; and
comparing the first and the second sets of configuration information to identify allowable and prohibited connections between the first LAN port and each of the interface connection ports and between the second LAN port and each of the interface connection ports of the LAN switch, and thereby define a first set of the server interfaces that are accessible via the first LAN and a second set of the server interfaces that are accessible via the second LAN.

11. The method of claim 10, wherein the plurality of LANs include a management LAN and a payload and management LAN.

12. The method of claim 10, and further comprising:
programming a first register in the LAN switch based on the configuration information from the first LAN;
programming a second register in the LAN switch based on the configuration information from the second LAN; and
wherein allowable and prohibited connections are identified based on the contents of the first and the second registers.

13. The method of claim 12, wherein the LAN switch is configured to allow a connection between two ports of the switch if the first and the second registers indicate that the connection is allowable, and is configured to disallow a connection between two ports of the switch if at least one of the first and the second registers indicate that the connection is not allowable.

14. The method of claim 10, wherein the server interfaces include a first interface for outputting hardware status information and a second interface for outputting operating system status information.

15. The method of claim 14, wherein the server interfaces include a third interface for outputting keyboard-video-mouse (KVM) data.

16. The method of claim 10, wherein the server is implemented as a server blade for a bladed server system.

17. The method of claim 10, wherein the server is implemented as a stand-alone server.

18. The method of claim 10, and further comprising:
associating ports in the LAN switch with a first and a second virtual LAN (VLAN) based on the first and the second sets of configuration information.

19. A computer system comprising:
a plurality of servers, each server including means for outputting server status information; and
switching means for switching LAN signals, the switching means including a plurality of interface ports configured to be coupled to the means for outputting server status information of at least one of the servers and a plurality of LAN ports configured to be coupled to a plurality of LANs, the switching means including means for comparing a first set of connection information received from a first one of the plurality of LANs via a first one of the LAN ports with a second set of connection information received from a second one of the plurality of LANs via a second one of the LAN ports to identify allowable and prohibited connections between the first LAN port and each of the interface ports and between the second LAN port and each of the interface ports of the switching means, thereby defining for each of the LANs a set of the server status information that is accessible from that LAN.

20. The computer system of claim 19, wherein the first LAN is a management LAN that is accessible by authorized information technology (IT) users, and the second LAN is a combined payload and management LAN that is accessible by authorized application users.

21. The computer system of claim 19, wherein the switching means further comprises:
first register means for indicating allowable connections between ports of the switching means, the first register means programmable only from the first LAN;
second register means for indicating allowable connections between ports of the switching means, the second register means programmable only from the second LAN; and
wherein a comparison of the contents of the first and the second register means indicates allowable connections between the ports of the switch means.

22. The computer system of claim 21, wherein the switching means is configured to allow a connection between two ports of the switching means if the first and the second register means indicate that the connection is allowable, and is configured to disallow a connection between two ports of the switching means if at least one of the first and the second register means indicate that the connection is not allowable.

23. The computer system of claim 19, wherein the means for outputting server status information includes means for outputting hardware status information to a first port of the switching means, and means for outputting operating system status information to a second port of the switching means.

24. The computer system of claim 23, wherein the means for outputting server status information includes means for outputting keyboard-video-mouse (KVM) data to a third port of the switching means.

25. The computer system of claim 19, wherein the computer system is implemented as a bladed computer system.

26. The computer system of claim 19, wherein the computer system is implemented as a rack of stand-alone servers.

27. The computer system of claim 19, and further comprising means for configuring a first and a second virtual LAN (VLAN) based on the first and the second sets of connection information.

* * * * *